(12) United States Patent
Ros

(10) Patent No.: US 11,920,832 B2
(45) Date of Patent: Mar. 5, 2024

(54) TRANSPORT CONTAINER

(71) Applicant: REP IP AG, Oberwil b. Zug (CH)

(72) Inventor: Nico Ros, Riehen (CH)

(73) Assignee: REP IP AG, Zug (CH)

( * ) Notice: Subject to any disclaimer, the term of this patent is extended or adjusted under 35 U.S.C. 154(b) by 0 days.

(21) Appl. No.: 16/324,149

(22) PCT Filed: Aug. 9, 2017

(86) PCT No.: PCT/IB2017/000941
§ 371 (c)(1),
(2) Date: Feb. 8, 2019

(87) PCT Pub. No.: WO2018/029522
PCT Pub. Date: Feb. 15, 2018

(65) Prior Publication Data
US 2019/0178534 A1 Jun. 13, 2019

(30) Foreign Application Priority Data
Aug. 9, 2016 (AT) .................................. A 368/2016

(51) Int. Cl.
*F25B 17/08* (2006.01)
*F25D 11/00* (2006.01)
*F25D 11/02* (2006.01)

(52) U.S. Cl.
CPC .............. *F25B 17/08* (2013.01); *F25D 11/00* (2013.01); *F25D 11/003* (2013.01); *F25D 11/027* (2013.01); *F25D 2201/12* (2013.01)

(58) Field of Classification Search
CPC ........ F25D 17/08; F25D 11/00; F25D 11/027; F25D 11/003; F25D 2201/12; F25D 3/08;
(Continued)

(56) References Cited

U.S. PATENT DOCUMENTS 1,729,081 A 9/1929 Miller
1,729,082 A 9/1929 Miller et al.
(Continued)

FOREIGN PATENT DOCUMENTS

CN 101280991 A 10/2008
CN 205002492 U 1/2016
(Continued)

OTHER PUBLICATIONS

Sakashita, Panel Shaped Adsorption Type Refrigerator, Apr. 10, 2002, JP2002107003A, Whole Document (Year: 2002).*
(Continued)

*Primary Examiner* — Larry L Furdge
(74) *Attorney, Agent, or Firm* — Pillsbury Winthrop Shaw Pittman, LLP

(57) ABSTRACT

In a transport container for transporting temperature-sensitive transport goods comprising a chamber for receiving the transport goods, a casing enclosing the chamber and at least one cooling element for temperature control of the chamber, the cooling element comprises an evaporation element with a cooling surface and a desiccant for receiving coolant evaporated in the evaporation element. The transport container further comprises a latent heat accumulator that communicates with the chamber for heat exchange.

13 Claims, 3 Drawing Sheets

Figure 1:
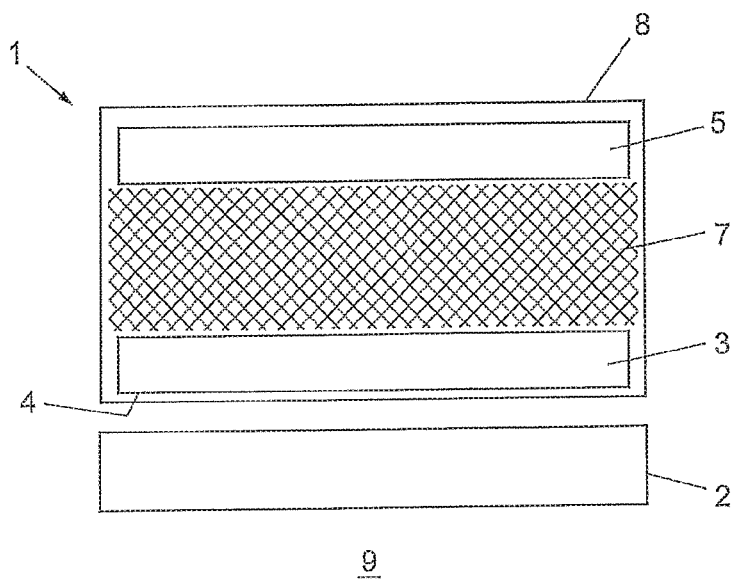

(58) Field of Classification Search
CPC . F25D 2303/08; F25D 2331/804; F25B 17/08
See application file for complete search history.

(56) References Cited

U.S. PATENT DOCUMENTS

| | | | |
|---|---|---|---|
| 4,152,901 A | 5/1979 | Munters | |
| 4,199,959 A | 4/1980 | Wurm | |
| 5,363,670 A | 11/1994 | Bartilucci | |
| 5,497,630 A | 3/1996 | Stein et al. | |
| 6,412,295 B2 | 7/2002 | Weiss | |
| 6,584,797 B1* | 7/2003 | Smith | C09K 5/047 62/371 |
| 7,213,403 B2 | 5/2007 | Maier-Laxhuber | |
| 2001/0025510 A1* | 10/2001 | Maier-Laxhuber | F25D 31/006 62/480 |
| 2002/0189279 A1 | 12/2002 | Pfister et al. | |
| 2004/0079106 A1* | 4/2004 | Maier-Laxhuber | F25B 17/08 62/480 |
| 2009/0044556 A1 | 2/2009 | Ihle | |
| 2009/0301127 A1 | 12/2009 | Kaufman | |
| 2010/0024439 A1* | 2/2010 | Finke | A47F 3/0486 62/3.6 |
| 2010/0170286 A1* | 7/2010 | Ghiraldi | F25D 11/006 62/434 |
| 2011/0271691 A1 | 11/2011 | Tuszkiewicz et al. | |
| 2012/0097216 A1* | 4/2012 | Lin | F24S 23/00 136/248 |
| 2013/0152612 A1* | 6/2013 | Smith | F25B 17/083 62/112 |
| 2014/0202661 A1* | 7/2014 | Goenka | B60H 1/00335 165/104.13 |
| 2014/0290293 A1 | 10/2014 | Eckhoff | |
| 2014/0360214 A1* | 12/2014 | Tansley | F25D 17/02 62/190 |
| 2016/0290696 A1 | 10/2016 | Barot | |
| 2017/0350635 A1 | 12/2017 | Thirumurugavel | |
| 2018/0080701 A1 | 3/2018 | Langlotz | |

FOREIGN PATENT DOCUMENTS

| | | | |
|---|---|---|---|
| DE | 1262306 B | | 3/1968 |
| DE | 3412556 A1 | | 10/1985 |
| DE | 102007010981 A1 | | 9/2008 |
| DE | 202015101481 U1 | | 8/2015 |
| EP | 1416233 A2 | | 5/2004 |
| FR | 2858601 A1 | | 2/2005 |
| JP | S58-164954 A | | 9/1983 |
| JP | S58164954 A | * | 9/1983 |
| JP | 60-16280 A | | 1/1985 |
| JP | 2002013835 A | * | 1/2002 |
| JP | 2002-107003 A | | 4/2002 |
| JP | 2002107003 A | * | 4/2002 |
| JP | 2005-299974 A | | 10/2005 |
| WO | 92/13244 A1 | | 8/1992 |
| WO | 00/50827 A1 | | 8/2000 |
| WO | 02/099345 A1 | | 12/2002 |
| WO | 03/059779 A1 | | 7/2003 |
| WO | 2011/032299 A1 | | 3/2011 |
| WO | 2018/029521 A1 | | 2/2018 |

OTHER PUBLICATIONS

Terai et al, Solar Heat Utilizing Heat Exchanger, Sep. 29, 1983, JPS58164954A, Whole Document (Year: 1983).*
Maier-Laxhuber et al., Sorption Cooler, Jan. 18, 2002, JP2002013835A, Whole Document (Year: 2002).*
International Search Report issued in International Application No. PCT/IB2017/000941 dated Oct. 23, 2017.
Notice of Allowance dated Jul. 21, 2021, issued in U.S. Appl. No. 16/324,170 (10 pgs.).
Office Action dated May 12, 2023, issued in corresponding U.S. Appl. No. 17/428,536 (24 pgs.).

* cited by examiner

TRANSPORT CONTAINER

CROSS-REFERENCE TO RELATED APPLICATIONS

This is the U.S. National Stage of PCT/IB2017/000941, filed Aug. 9, 2017, which claims priority to AT A 368/2016, filed Aug. 9, 2016, and all contents of each of these applications are incorporated herein by reference in their entireties.

The invention relates to a transport container for the transport of temperature-sensitive transport goods comprising a chamber for receiving the transport goods, a casing enclosing the chamber and at least one cooling element for controlling temperature of the chamber, wherein the cooling element comprises:
- an evaporation element with a cooling surface,
- a desiccant for receiving coolant evaporated in the evaporation element,
- a transport path for transporting the evaporated coolant to the desiccant,
- optionally, a reservoir for the coolant that is fluidly connectable with the evaporation element.

When transporting temperature-sensitive transport goods, such as drugs, over periods of several hours or days, predetermined temperature ranges must be met during storage and transport to ensure the usability and safety of the drug. For various drugs storage and transport conditions are prescribed that require temperature ranges from 2 to 25° C., especially 2 to 8° C.

The desired temperature range can be above or below the ambient temperature, so that either cooling or heating of the interior of the transport container is required. If the environmental conditions change during a transport operation, the required temperature control includes both cooling and heating. In order that the desired temperature range is permanently and demonstrably adhered to during transport, transport containers with special insulation capacity are used. These containers are equipped with passive or active temperature control elements. Passive temperature control elements do not require any external power supply during use, but use their heat storage capacity, and depending on the temperature level a release or absorption of heat occurs to or from the interior of the transport container. However, such passive temperature control elements are depleted as soon as the temperature equalisation with the interior of the transport container is completed.

A special form of passive temperature control elements are latent heat accumulators that are able to store thermal energy in phase change materials, of which the latent heat of fusion, of solution or of absorption are much greater than the heat that they can store due to their normal specific heat capacity. A disadvantage of latent heat accumulators is the fact that they lose their effect as soon as the entire material has completely gone through the phase change. However, by performing the reverse phase change, the latent heat accumulators may be recharged.

Active temperature control elements require an external energy supply for their operation. They are based on the transformation of a non-thermal energy form into a thermal energy form. The release or absorption of heat takes place, for example, in the context of a thermodynamic cycle such as, e.g. by means of a compression refrigeration machine. Another embodiment of active temperature control elements works on the basis of the thermoelectric principle, wherein so-called Peltier elements are used.

Therefore, the energy needed for the temperature control of a transport container must be carried in the form of an electrical storage or of a thermal storage. In the particular case of transport containers for airfreight, not only the volume, but also the weight and the ability of being allowed, of the temperature control system including the energy storage, is of high importance. The cooling systems existing today often have a large weight in relation to the insulation. The high weight in passive cooling systems is due to the limited enthalpy, which, in the utilizable temperature ranges from 2-8° C., 15-25° C. and 34-38° C., is about 200 kJ/kg. The energy density of accumulators required for active cooling systems is generally greater than 200 kJ/kg, but the maximum permissible energy density for transport in aircraft is limited to approximately 180 kJ/kg.

From WO 02/099345 A1 a transport container has become known, which is equipped with a passive temperature control element in the form of a sorption cooling system. The cooling system comprises an evaporation element with a cooling surface, a desiccant for absorption of the coolant evaporated from the evaporation element, a transport path for transporting the evaporated coolant to the desiccant and a reservoir for the coolant that is fluidly connectable with the evaporation element. As a coolant, for example, water is used, wherein the amount of heat required for the evaporation of the coolant is removed from the transport goods that are to be cooled, the transport goods being cooled in this manner. Such a cooling system is inexpensive and has a low volume and a low weight. Already a comparatively small amount of coolant is sufficient to achieve a high cooling performance, because high amounts of energy are required for the evaporation of liquids, which are significantly higher than those for the phase transition from solid to liquid. The energy required to evaporate water at 8° C. is approx. 2.500 kJ/kg. The absolute amount of water that air or a gas or a gas mixture can absorb (100% relative humidity), depends heavily on the temperature. At a temperature of 30° C., 1 cubic meter of air can absorb 30 gr water, but at a temperature of 5° C. 1 cubic meter of air can only absorb about 7 gr water. The evaporation rate and thus the cooling capacity can be adjusted by the following parameters: the water supply per unit time, the size of the evaporation surface and the relative water saturation of the surrounding gas. In order to achieve a low water saturation of the surrounding gas, the gas loaded with the evaporated water is passed to a desiccant, which adsorbs the water. The desiccant is in this case on that side of the cooling element, that shall emit the heat, and the evaporation layer is located on that side of the cooling element, on which cooling shall be achieved.

A disadvantage of the cooling system described in WO 02/099345 A1 is that the transport container can only be cooled, but not heated. However, heating is, for example, required if the ambient temperature is well below 0° C. and the transport goods are to be maintained at a temperature range of 2-8° C. Another problem is that the evaporative cooling is also active when the ambient temperature is anyway in the desired range of e.g. 2-8° C., e.g. if the transport container is stored for a long time in a refrigerated warehouse, which can sometimes be the case for up to 60 days during customs clearance. The coolant to be evaporated is consumed after such a long time, so that after leaving the refrigerated warehouse no further cooling power is available for further transport.

The invention therefore aims to provide a transport container of the type mentioned at the outset that has an improved cooling system. In particular, the cooling system is to be improved to the effect that the transport goods can be kept in a predefined temperature range over a longer transport time without changing the weight of the cooling system, or that a weight and/or volume reduction of the cooling system can be achieved without reducing the maximum possible transport time, respectively. In this case, the predefined temperature range shall not only be maintained at an ambient temperature that is higher than the temperature range, but also at an ambient temperature that is lower than the temperature range.

To solve this problem, in a transport container of the type mentioned at the outset, the invention essentially provides that the transport container further comprises a latent heat accumulator that communicates with the chamber for heat exchange. The combination of two different cooling systems, namely an evaporative cooling system with a latent heat accumulator, results in a number of advantages. The cooling capacity of the evaporative cooling system can be reduced so that it can be made smaller and with less weight. The total cooling capacity can be divided between the evaporative cooling system and the latent heat accumulator. The cooling system can be designed so that—if the performance of the evaporative cooling system is insufficient and the temperature of the chamber increases—the additional cooling power is obtained from the latent heat accumulator, which requires energy for the phase transition from solid to liquid.

The cooling system may preferably be designed such that the phase transition temperature (solid to liquid) of the latent heat accumulator is chosen to be lower than the temperature resulting from the cooling capacity of the evaporative cooling system. With the evaporative cooling system the temperature of the chamber can be preferably reduced to a temperature of 12-20° C., the further cooling to a temperature in the range of 2-8° C. being performed by means of the latent heat accumulator. Due to this combination the desiccant of the evaporative cooling system can be operated at a higher relative humidity, whereby the amount of desiccant can be reduced. Also, the amount of the latent heat accumulator can be reduced, since it must only provide the energy for cooling from the range of 12-20° C. to the range of 2-8° C.

Another advantage is that, in a partially charged (i.e. not fully crystallized) latent heat accumulator, the same can be used to protect the chamber from overcooling or to keep the chamber within the desired temperature range of e.g. 2-8° C., when the outside temperature drops below the level of the desired temperature range.

In a preferred embodiment, in which the transport goods are to be kept in the chamber at a temperature range of 2-8° C., the latent heat accumulator has a phase transition temperature of approx. 4-6° C.

If the transport container is stored in a refrigerated warehouse (e.g. in a customs warehouse) for a longer time (e.g. for several days), e.g. at a temperature of 2-8° C., and the evaporative cooling system is set to a cooling capacity so as to achieve a temperature lying above the temperature prevailing in the refrigerated warehouse, the evaporative cooling system is not active during the storage period, so that no coolant is consumed. Furthermore, the period of storage can be used to charge the latent heat accumulator, which happens automatically in the refrigerated warehouse at a temperature of e.g. below 6° C., if the phase transition temperature of the latent heat accumulator is 6° C. As a result, with minimal dimensioning of the two systems (latent heat accumulator and evaporative cooling system) a longer operation or transport duration of the transport container can be achieved as if only one cooling system would be used alone.

Another advantage of the invention arises when the evaporative cooling system provides more cooling capacity than required. The excess cooling power can then be used to recharge the latent heat accumulator, i.e. to have it returned into the solid or crystallized state.

A preferred embodiment of the invention provides that the evaporative cooling system and the latent heat accumulator are arranged in a cascading manner, i.e. that seen in the direction from the outside to the inside of the transport container first the evaporative cooling system is effective and then the latent heat accumulator. The cooling surface of the evaporation element therefore communicates with the latent heat accumulator for the heat exchange and the latent heat accumulator communicates with the chamber for the heat exchange. From a constructive point of view, this can preferably be realized in that the latent heat accumulator is arranged between the cooling surface and the chamber.

If the cooling capacity of the evaporative cooling system is set to a temperature above the phase transition temperature of the latent heat accumulator, a preferred embodiment provides that the cooling surface and the latent heat accumulator are separated by a thermal insulation. Although the cooling surface of the evaporation element and the latent heat accumulator are then in heat exchange connection with each other, the heat exchange, however, is significantly slowed down by the thermal insulation, so that a corresponding temperature gradient results therefrom.

To ensure a safe operation of the evaporative cooling system, wherein the relative humidity can be controlled independently of the environment, it is preferably provided that the cooling element is sealed against the environment in a vapour diffusion tight manner. The evaporated coolant is thus completely adsorbed in the desiccant, wherein the cooling capacity may be adjusted in a simple manner by adjusting the relative humidity prevailing in the gas atmosphere of the evaporative cooling system.

Furthermore, it is preferably provided that the evaporation element and the desiccant are separated by a thermal insulation. The thermal insulation may be formed as an insulation layer arranged between the evaporation element and the desiccant, wherein the insulation layer can be used as a transport path for transporting the evaporated coolant to the desiccant. In this context a preferred embodiment provides that the thermal insulation between the evaporation element and the desiccant comprises an insulating layer that is permeable to vapour diffusion, which forms the transport path.

Alternatively, the transport path may comprise at least one channel extending between the evaporation element and the desiccant.

Particularly suitable as desiccant are silica gels. These are inexpensive and can absorb up to 60% of their own weight of liquid, especially water.

The evaporation element advantageously comprises a textile, in particular a felt, which contains the coolant, in particular water. In principle, any material that has a large surface is suitable.

With regard to the latent heat accumulator, one of which the phase change occurs in the temperature range of the desired temperature by the transition between solid and liquid or vice versa is preferred. Preferred phase change materials include paraffins and salt mixtures, such as e.g. RT5 of the company Rubitherm or paraffins from the company Sasol.

Particularly preferably, the latent heat accumulator has a phase transition temperature of 3-10° C., in particular 5° C., so that the chamber for the transport goods can be kept in a simple manner in a temperature range of 2-8° C.

The latent heat accumulator may preferably be formed as a plate-shaped element. According to an advantageous embodiment the plate-shaped element may comprise a plurality of in particular honeycomb-shaped hollow chambers, which are filled with the latent heat accumulator material, wherein a honeycomb structural element according to WO 2011/032299 A1 is particularly advantageous.

A particularly efficient temperature control is achieved according to a preferred embodiment, if the latent heat accumulator chamber surrounds the chamber on all sides. Furthermore, it can also be provided that the cooling surface of the evaporation element, surrounds the chamber on all sides.

In this context, it can be provided that the Latent heat accumulator and the evaporation element each form a layer of the shell of the transport container.

The transport container according to the invention can in principle be realized in any dimensions.

The invention will be described below in more detail with reference to exemplary embodiments as shown schematically in the drawing.

Figure 2:
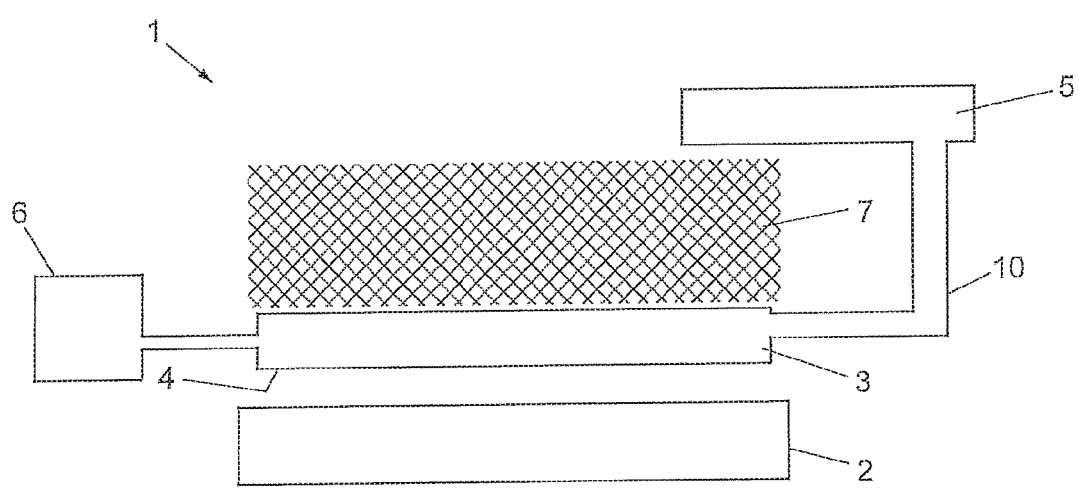
Figure 3:
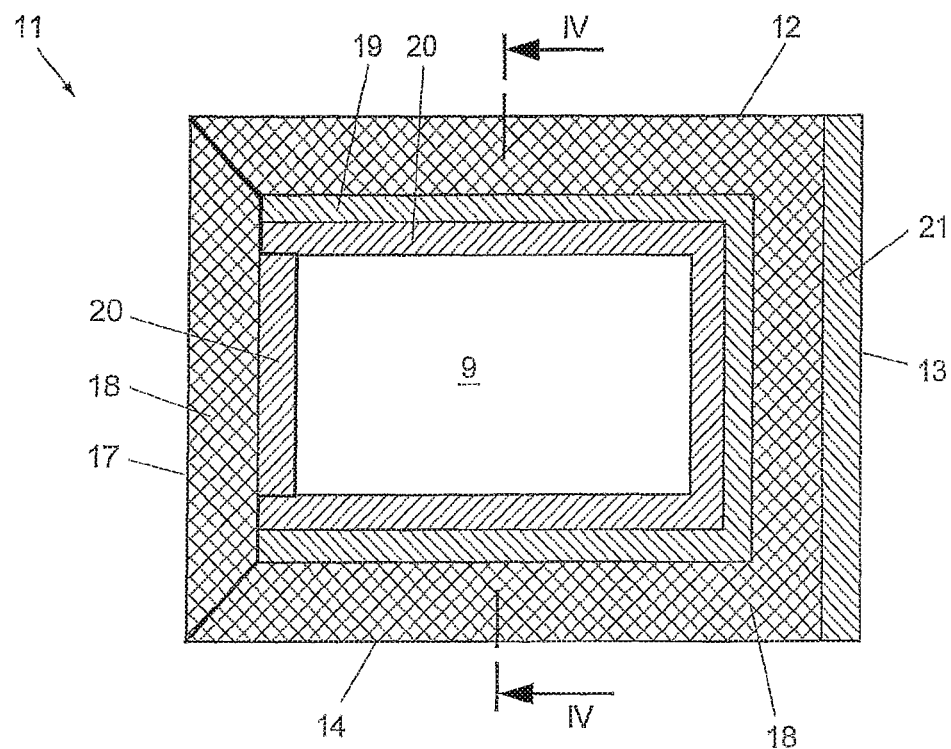
Figure 4:
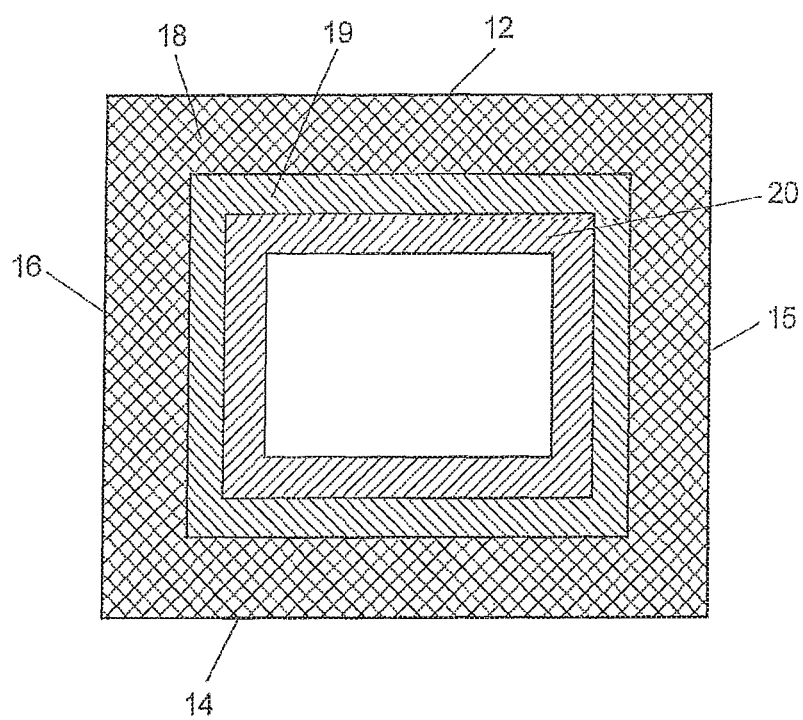
Figure 5:
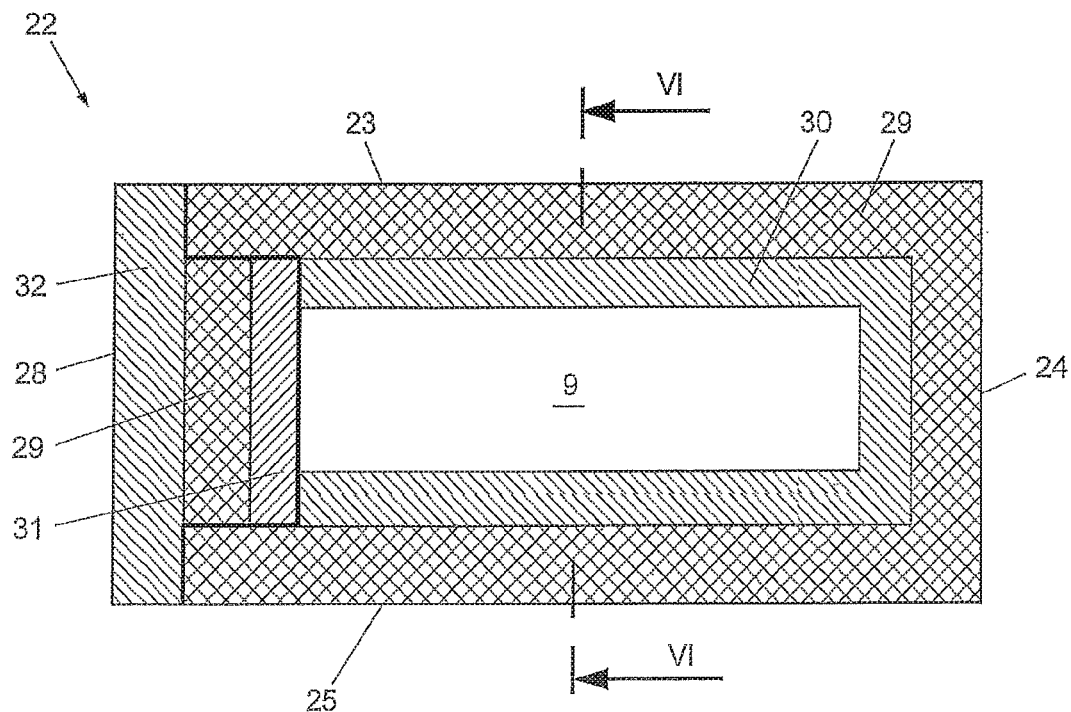
Figure 6:
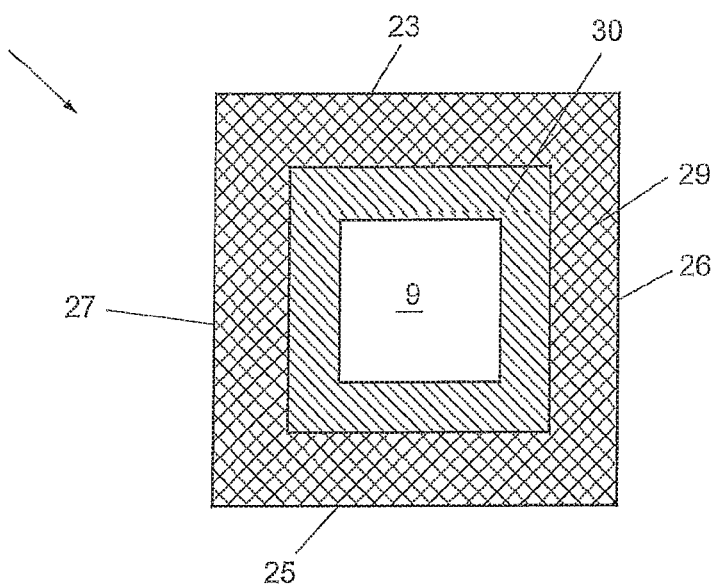

Therein, FIG. 1 shows a first embodiment of the cooling system for a transport container according to the invention, FIG. 2 shows a second embodiment of the cooling system for a transport container according to the invention, FIG. 3 shows a cross section of a first embodiment of a transport container with a cooling system, FIG. 4 shows a cross section along the line IV-IV of FIG. 3, FIG. 5 shows a cross section of a second embodiment of a transport container with a cooling system and FIG. 6 shows a cross-section along the line VI-VI of FIG. 5.

In FIG. 1, a cooling system is shown, which comprises an evaporative cooling system 1 and a latent heat accumulator 2. The evaporative cooling system 1 comprises an evaporation element 3, which is soaked with a coolant, such as water, and has a cooling surface 4, and a desiccant 5 for receiving evaporated coolant from the evaporation element 3. Between the evaporation element 3 and the desiccant 5, a thermal insulation layer 7 is arranged, which is formed open to vapour diffusion, in order to allow the transport of the evaporated coolant from the evaporation element 3 to the desiccant 5. That evaporated coolant is adsorbed in the desiccant 5, which, e.g., is formed as silica gel. The described elements of the evaporative cooling system 1 are surrounded by a gas-tight shell or a gas-tight housing 8 so that the relative humidity of the gas atmosphere within the evaporative cooling system 1 can be controlled independently of the environment.

The desiccant 5 is arranged on that side of the evaporative cooling system 1, on which heat is to be given off, and the evaporation element 3 is located on the (opposite) side of the evaporative cooling system 1, on which cooling is to be effected.

On the cooling side of the evaporative cooling system 1, a plate-shaped latent heat accumulator 2 is now arranged, which is in heat exchange connection with the cooling surface 4 of the evaporative cooling system 1 either directly or with the interposition of a thermal insulation (not shown). The chamber 9 to be temperature controlled is arranged on the side of the latent heat accumulator 2 that faces away from the evaporative cooling system 1.

In FIG. 2 an alternative embodiment is shown, wherein the same reference numerals designate the same components as in FIG. 1. The embodiment of FIG. 2 differs from the embodiment of FIG. 1 in that the transport of the evaporated coolant from the evaporation element 3 to the desiccant 5 is not performed through the insulating layer 7, but via a separate channel 10. The gas-tight shell therefore does not have to surround the insulating layer 7, but is limited to the evaporation element 3, the channel 10 and the desiccant 5. This design allows greater flexibility in the arrangement of the desiccant 5, wherein the desiccant, for example, may be interchangeably arranged in the transport container. Furthermore, a reservoir 6 for the coolant, in particular water, is provided, which is connected to the evaporation element 3, which allows refilling of coolant in a simple manner. The embodiment as shown in FIG. 2 is particularly suitable for large-volume transport containers.

FIGS. 3 and 4 show a cuboid transport container 11, the walls of which are designated with 12, 13, 14, 15 and 16. On the sixth side the transport container 11 is closed by a door or a lid 17. The walls and the lid have the following layer structure. The walls 12, 13, 14, 15 and 16 each comprise an outer insulating layer 18 made of a thermally insulating material. This is followed by a layer 19 formed as an evaporation element. The innermost layer 20, which delimits the chamber 9 to be temperature controlled, is designed as a latent heat accumulator layer. The wall 13 additionally has the desiccant as the outermost layer 21. However, the desiccant-containing layer may also be arranged on another wall as the outermost layer. The insulating layer 18 is formed to be permeable to vapour diffusion, in order to allow the transport of the evaporated coolant from the evaporation layer 19 to the desiccant 21. The lid 17 comprises only the outer insulating layer 18 and the latent heat accumulator layer 20.

FIGS. 5 and 6 show a modified embodiment of a cuboid transport container 22, the walls of which are designated by 23, 24, 25, 26 and 27. On the sixth side the transport container 22 is closed by a door or a lid 28. The walls and the lid have the following layer structure. The walls 23, 24, 25, 26 and 27 each comprise an outer insulating layer 29 and an inner latent heat accumulator layer 30. The lid 28 likewise comprises an insulating layer 29, which is located between an inner layer 31 designed as an evaporation element and an outer layer 32 comprising the desiccant. The lid 28 is replaceable in a simple manner, whereby a consumed cooling element can be exchanged for an unconsumed cooling element.

The invention claimed is:

1. Transport container for transporting temperature-sensitive transport goods comprising a chamber for receiving the transport goods, a casing enclosing the chamber and at least one cooling element for temperature control of the chamber, the at least one cooling element comprising:
   an element with a cooling surface,
   a desiccant for receiving coolant evaporated in the evaporation element,
   a transport path for transporting the evaporated coolant to the desiccant,
   wherein the transport container further comprises a latent heat accumulator that communicates with the chamber for heat exchange in addition to the evaporation element, the latent heat accumulator comprising a phase change material and being separate and distinct from the evaporation element, wherein the evaporation element and the desiccant are separated by a first thermal insulation, wherein the latent heat accumulator is arranged outside of the evaporation element and is arranged between the cooling surface and the chamber in a cascading manner such that, when viewed in a direction from outside to inside of the transport container through the first thermal insulation, first the evaporative cooling system is effective and then the latent heat accumulator relative to the chamber for heat exchange;

wherein the latent heat accumulator has a phase transition temperature of 3-10° C.;

wherein the evaporation element comprises a textile which contains the coolant; and wherein the phase change material includes paraffins.

2. The transport container according to claim 1, wherein the cooling surface communicates with the latent heat accumulator for heat exchange and the latent heat accumulator communicates with the chamber for heat exchange.

3. The transport container according to claim 1, wherein the cooling surface and the latent heat accumulator are separated by a second thermal insulation.

4. The transport container according to claim 1, wherein the cooling element is sealed against the environment in a vapour diffusion tight manner.

5. The transport container according to claim 1, wherein the latent heat accumulator surrounds the chamber on all sides.

6. The transport container according to claim 1, wherein the cooling surface of the evaporation element surrounds the chamber on all sides.

7. The transport container according to claim 1, wherein the latent heat accumulator and the evaporation element each form a layer of the casing of the transport container.

8. The transport container according to claim 1, wherein the textile comprises a felt and wherein the coolant comprises water.

9. The transport container according to claim 1, further comprising a reservoir for the coolant that is fluidly connectable with the evaporation element.

10. The transport container according to claim 1, wherein the latent heat accumulator is spaced from the casing that encloses the chamber and the at least one cooling element.

11. The transport container according to claim 1, wherein the latent heat accumulator is plate-shaped and positioned in a heat exchange connection with the cooling surface of the evaporation element.

12. The transport container according to claim 1, wherein the at least one cooling element is positioned on one side of the latent heat accumulator and the chamber is positioned on an opposite side thereof.

13. The transport container according to claim 1, wherein the phase transition temperature of the latent heat accumulator is lower than a temperature resulting from a cooling capacity of the evaporation element.

* * * * *